United States Patent

Scahill et al.

[11] Patent Number: 5,999,902
[45] Date of Patent: Dec. 7, 1999

[54] SPEECH RECOGNITION INCORPORATING A PRIORI PROBABILITY WEIGHTING FACTORS

[75] Inventors: Francis James Scahill; Alison Diane Simons; Steven John Whittaker, all of Ipswich, United Kingdom

[73] Assignee: British Telecommunications public Limited Company, London, United Kingdom

[21] Appl. No.: 08/875,070
[22] PCT Filed: Mar. 7, 1996
[86] PCT No.: PCT/GB96/00531
§ 371 Date: Jul. 16, 1997
§ 102(e) Date: Jul. 16, 1997
[87] PCT Pub. No.: WO96/27872
PCT Pub. Date: Sep. 12, 1996

[30] Foreign Application Priority Data

Mar. 7, 1995 [EP] European Pat. Off. ............. 95301477

[51] Int. Cl.⁶ ...................................................... G10L 5/06
[52] U.S. Cl. ............................................. 704/240; 704/239
[58] Field of Search .................................... 704/231, 239, 704/240, 243, 245, 251, 255, 256, 257

[56] References Cited

U.S. PATENT DOCUMENTS 4,783,803  11/1988  Baker et al. ............................. 704/252
5,202,952  4/1993  Gillick et al. ............................ 704/200
5,749,069  5/1998  Komori et al. .......................... 704/252

FOREIGN PATENT DOCUMENTS 0 555 545  8/1993  European Pat. Off. .
4-115296  4/1992  Japan .

OTHER PUBLICATIONS

Ali et al, "Syllable Recognition Using an Adaptive Pattern Recognition Technique", Nov. 25, 1992, Journal of The Institution of Electronics & Telecommunication Engineers, pp. 677–683.

*Primary Examiner*—Susan Wieland
*Attorney, Agent, or Firm*—Nixon & Vanderhye P.C.

[57] ABSTRACT

A recognizer is provided with a priori probability values (e.g., from some previous recognition) indicating how likely the various words of the recognizer's vocabulary are to occur in the particular context, and recognition "scores" are weighted by these values before a result (or results) is chosen. The recognizer also employs "pruning" whereby low-scoring partial results are discarded, so as to speed the recognition process. To avoid premature pruning of the more likely words, probability values are applied before the pruning decisions are made. A method of applying these probability values is described.

12 Claims, 5 Drawing Sheets

SPEECH RECOGNITION INCORPORATING A *PRIORI* PROBABILITY WEIGHTING FACTORS

BACKGROUND OF THE INVENTION

1. Field of the Invention

This invention relates generally to apparatus and method for use in speech recognition.

2. Related Art

The speech recogniser to be described finds application in situations where a recognition process is to be undertaken for the purpose of ascertaining which one of a vocabulary of words (or, more generally, utterances) an input voice signal most clearly resembles, and information is available as to the a priori probabilities associated with the words of the vocabulary. One example of such a situation is the automatic telephone directory enquiry system described in our co-pending International patent application No. WO95/02524. In that system, (i) the user speaks the name of a town;

(ii) a speech recogniser, by reference to stored town data identifies several towns as having the closest matches to the spoken town name, and produces a "score" or probability indicating the closeness of the match;

(iii) a list is compiled of all road names occurring in the identified towns;

(iv) the user speaks the name of a road;

(v) the speech recogniser identifies several road names, of the ones in the list, having the closest matches to the spoken road name, again with scores;

(vi) the road scores are each weighted accordingly to the score obtained for the town the road is located in, and the most likely "road" result considered to be the one with the best weighted score.

The a priori probabilities do not necessarily have to originate from a preceding speech recognition process; for example another directory enquiry system, also described in the above-noted patent application, uses signals identifying the origin of a call to access statistical information as to the most likely towns to be wanted by an enquirer from that area to weight the results of a town name recognition process.

This process has the advantage of reliability—the retention of, for example, the second choice towns does not result in the selection of a road in that town unless that road scores markedly better in the road name recognition step than the first choice town. A disadvantage of this process however is that because the recogniser, when performing the road-name recognition step, produces only a limited number of candidate road names, it is possible that this short-list of road names may contain only the names of roads located in the more poorly-scoring towns—i.e. poorly-scoring road names, of roads located in high-scoring towns, have already been "pruned out" by the recogniser before the weighting process can be applied.

U.S. Pat. No. 4,783,803 describes a speech recognition apparatus in which the a priori probabilities relate to the given context of one or more patterns that have previously been recognised. A language score indicative of the probability of a certain word occurring after another certain word is combined with the score obtained for a sequence containing those words.

SUMMARY OF THE INVENTION

According to the present invention there is provided a method of speech recognition comprising:

repetitively comparing portions of an unknown utterance with reference models to generate, for each of a plurality of allowable sequences of reference utterances defined by stored data defining such sequences, accumulated measures of similarity including contributions from previously generated measures obtained from comparison of one or more earlier portions of the utterance with a reference model or models corresponding to an earlier utterance or utterances in the respective allowable sequence, excluding from further repetitive comparison any sequence for which the accumulated measure is, to a degree defined by a predetermined pruning criterion, less indicative of similarity than the measures for other such sequences, and weighting the accumulated measures in accordance with weighting factors for each of the allowed sequences wherein the weighting is performed by weighting each computation of a measure or accumulated measure for a partial sequence by combined values of the weighting factors for each of the allowable sequences which commence with that partial sequence, less any such weighting factors applied to a measure generated in respect of an utterance or shorter sequence with which that partial sequence commences.

Preferably any sequence for which the weighted accumulated measure is, to a degree defined by a pruning criterion, less indicative of similarity than the measures for other such sequences is excluded from further repetitive comparison. This pruning may be carried out in dependence on the number of measures generated and not excluded from further repetitive comparison, such as to tend to maintain that number constant.

In another aspect of the invention there is provided speech recognition apparatus comprising:

storage means for storing data relating to reference models representing utterances and data defining allowable sequences of reference utterances;

comparing means to repetitively compare portions of an unknown utterance with reference models to generate, for each of a plurality of allowable sequences of reference utterances defined by stored data defining such sequences, accumulated measures of similarity including contributions from previously generated measures obtained from comparison of one or more earlier portions of the utterance with a reference model or models corresponding to an earlier utterance or utterances in the respective allowable sequence;

and means operable to weight the accumulated measures in accordance with weighting factors for each of the allowed sequences wherein the weighting means is operable to weight a measure or accumulated measure for a partial sequence by combined values of the weighting factors for each of the allowable sequences which commence with that partial sequence, less any such weighting factors applied to a measure generated in respect of an utterance or shorter sequence with which that partial sequence commences.

In yet another aspect the present invention provides a method of speech recognition by reference to stored data defining reference models corresponding to sounds and stored data defining allowable sequences of such models, each sequence corresponding to an utterance to be recognised, the method comprising comparing portions of an unknown utterance with the reference models to update measures indicative of the similarity between an earlier portion of the utterance and a partial allowable sequence to produce updated measures indicative of the similarity between a longer portion of the utterance and longer partial allowable sequences; identifying those partial sequences for which the measures represent less than a defined degree of similarity; and suppressing the further generation of measures pertaining to any sequence or partial sequence which begins with one of the identified partial sequences, characterised in that the identification is performed by comparing the measures with a threshold value and that the threshold value is repeatedly adjusted in dependence on the number of measures generated and not suppressed, such as to tend to maintain that number constant.

In yet another aspect of the invention there is provided a method of assigning a weighting factor to each node of a speech recognition network representing a plurality of allowable sequences of reference utterances, said method comprising:

combining, for each node, the values of the weighting factor(s) for each of the allowable sequence(s) which commence with a partial sequence incorporating the node less any weighting factors applied to an utterance or shorter sequence with which that partial sequence commences.

The weighting factors may be generated in the log domain, the log of the given weighting factors being assigned to the final nodes of the network corresponding to the allowable sequences; each preceding node is then assigned a log probability value which is the maximum of those values assigned to the node or nodes which follow it; and the value assigned to the node which precedes it is subtracted from the value for each node.

The nodes may be associated with models representing reference utterances and parameters of the associated models may be modified to reflect the weighting factor assigned to each node.

The invention is particularly applicable to a recognition network that has a tree structure, at least one node other than the first having more than one branch.

BRIEF DESCRIPTION OF THE DRAWINGS

Some embodiments of the invention will now be described, by way of example, with reference to the accompanying drawings, in which.

DETAILED DESCRIPTION OF EXEMPLARY EMBODIMENTS

There are basically two approaches to speech recognition, parallel processing, in which each utterance (e.g. a word) is successively compared with reference templates or models to identify one or more of the most similar ones, and tree processing in which a part of an utterance (e.g. a phoneme) is compared with reference templates or models ("models" here is used generically) to identify that part; the next part is then subject to a similar process.

An embodiment, using a tree structure, will now be described.

Figure 1:
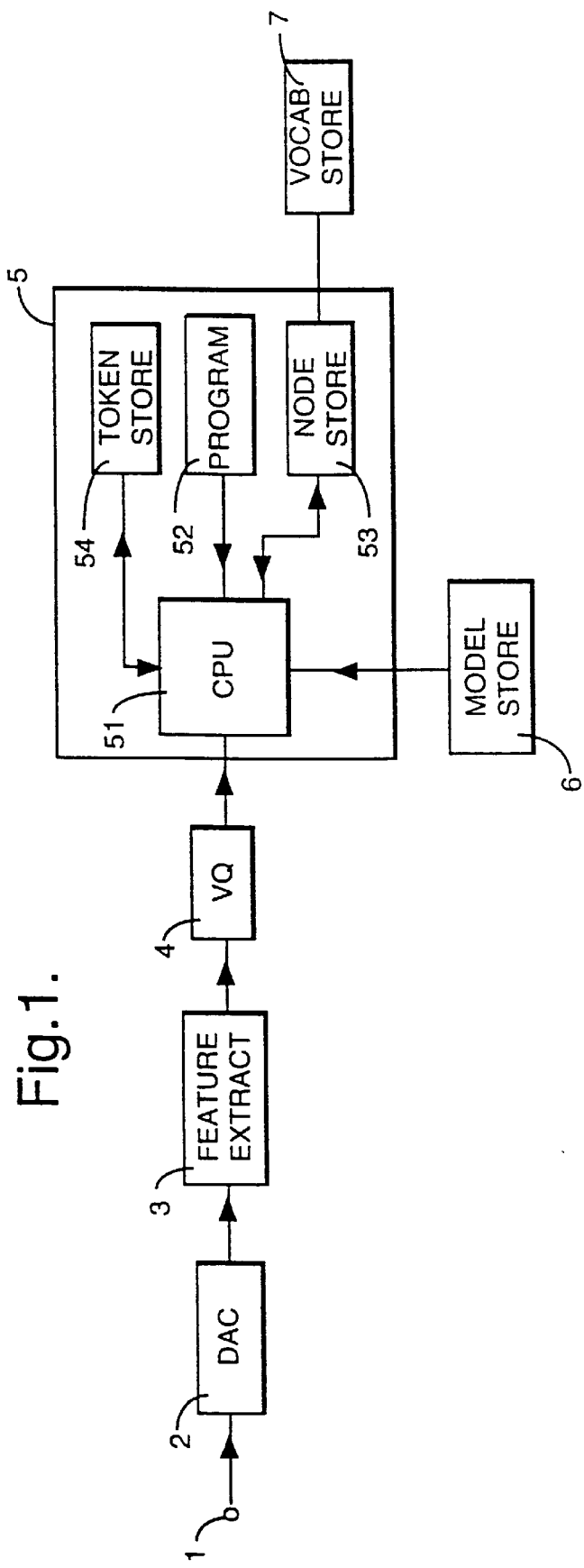
FIG. 1 is a block diagram of an apparatus according to one embodiment of the present invention.

The speech recogniser of FIG. 1 has an input 1 for speech signals, which are converted into digital form by a digital-to-analogue converter 2. The digitised signals are then supplied to a feature extractor 3 which calculates for each of successive frames of, for example, 10 ms duration a number of parameters or "features". Any of the features conventionally used may be chosen, for example Mel frequency cepstral coefficients or Linear Prediction Coefficients.

The number of possible feature value combinations per frame is quite large, and to reduce the subsequent processing to manageable proportions it is usual to apply vector quantisation, viz. to match the set of features to one of a limited number m of standard feature combinations ($v_1$, $v_2$ ... $v_m$); this is performed by a vector quantiser 4 to produce a single number or "observation" $O_j$ (for the j'th frame). This is then applied to a classifier 5 which in general terms, matches the observation sequence [$O_j$] against a set of models stored in a model store 6. Each model corresponds to a different sub-word, for example a phoneme. The classifier comprises a central processor 51, controlled by a stored program in a program store 52, a node store 53 and a token store 54. The classifier performs a classification process employing Hidden Markov models, the principles of which will now be described.

Conceptually, a Hidden Markov model is a "black box" which has a number n of possible states and at regular intervals can progress from one state to another, or alternatively remain in the same state, in accordance with a probability parameter; the probability of transition from state i to state j is $a_{ij}$ whilst the probability of remaining in state i is $a_{ii}$. It follows that:

$$\sum_{j=1}^{n} a_{ij} = 1$$

Because of the temporal ordering of speech sounds, a left-right model is generally used for which $a_{ij}$ is non zero only for $0 \leq j-i \leq 1$. In any particular state, an output is produced, which may be one of a finite number m of possible outputs, say $v_1$, $v_2$ ... $v_m$, in accordance with a second set of probabilities. In the present context $V_k$ identifies a particular set of speech features. The probability when in state j of producing output $v_k$ is $b_{jk}$. Thus $$\sum_{k=1}^{m} b_{jk} = 1$$

A third parameter is the probability of starting in any particular state; the probability of starting in state i is $\pi_i$.

Thus the model consists of a set of parameters

A=[$a_{ij}$] (i=1 ... n, j=1 ... n)
B=[$b_{jk}$] (j=1 ... n, k=1 ... n)
$\pi$=[$\pi_i$] (i=1 ... n)

and a set of rules which can be applied to the parameters to produce an output sequence. In fact, the model does not exist, nor is the output sequence ever produced. Rather, the speech recognition problem is formulated as the question "given a sequence of v's each representing an observed set of speech features, what is the probability P that the model M defined by A, B, $\pi$ could produce this sequence (the "observation sequence")?".

If this question is asked for a number of different models each representing a different phoneme (for example) then the phoneme represented by the model having the highest probability is considered to have been recognised.

Supposing that the observation sequence is $O_1, O_2 \ldots O_T$ over time t=1 to t=T. The probability $\alpha_T(j)$ of reaching state j with this observation is given by the recursion formulae.

$$\alpha_i(j) = \pi_j b_j(O_t) \quad \ldots (1)$$

$$\alpha_{i+1}(j) = \sum_{i=1}^{n} \alpha_i(i) a_{ij} b_j(O_{i+1}) \quad \ldots (2)$$

The probability of the observation sequence O being produced by the model M is $$Pr(O \mid M) = \sum_{j=1}^{N} \alpha_T(j) \quad \ldots (3)$$

This is the probability of the observation sequence O, considering all possible state sequences; in practice, to reduce the amount of computation, it is usual to invoke the Viterbi algorithm and compute the probability associated with that state sequence which has the highest probability of producing the observation sequence: in this case equations 1 to 3 are replaced by $$\phi_t(j) = \pi_j b_j(O_t) \quad \ldots (4)$$

$$\phi_{1+t}(j)_{i=1,2,\ldots n}{}^{Max} [\phi_1(i) a_{ij}] \cdot b_j(O_{1+t}) \quad \ldots (5)$$

$$Pr^v(O|M) =_{j=1,2\ldots n}{}^{Max} \phi_T(j) \quad \ldots (6)$$

OR, in the log domain $$\log \phi_t(j) = \log(\pi_j) + \log(b_j(O_t)) \quad \ldots (7)$$

$$\log \phi_{1+t}(j) =_{i=1,2\ldots n}{}^{Max}[\log(\phi_1(i) + \log(a_{ij}))] + \log(b_j(O_1+1)) \quad \ldots (8)$$

$$\log Pr^v(O|M) =_{j=1,2\ldots n}{}^{Max}[\log(\phi_T(j)] \quad \ldots (9)$$

The model store 6 contains values of A, B and π for each phoneme in the relevant language (these together being referred to as the model M). The training process for generating the parameters of the models is conventional and will not be described further. Reference may be made to "Hidden Markov Models for Automatic Speech Recognition: Theory and Application" S. J. Cox, British Telecom Technology Journal Vol. 6, No. 2, April 1988. The recognition of a phoneme in a particular observation sequence O is performed by computing $P_r^v(O|M_i)$ for each model $M_1$ . . . $M_Q$ (where Q is the number of models): the phoneme whose model produces the highest $P_r^v$ is considered to be the one recognised.

Of course, for practical purposes we need to recognise words. This process may be visualised in the form of a network or tree-structure having a number of nodes. This structure exists only in the sense that each node corresponds to a respective area of the memory, as will be seen later.

Figure 2:
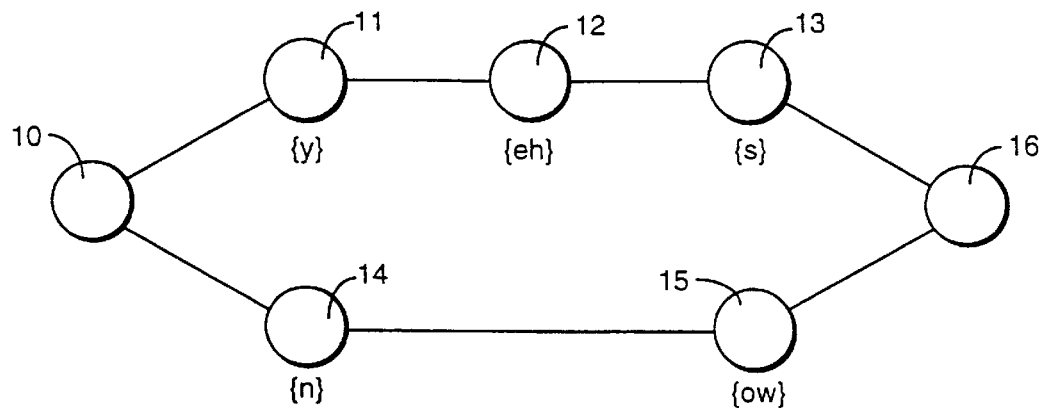
FIG. 2 shows an illustrative network of Hidden Markov models.

FIG. 2 shows a simple network for distinguishing between "yes" and "no", whose phonemic representations are denoted here as {y}{eh}{s} and {n}{ow}.

Node 10 in FIG. 2 corresponds to a noise model (generally a 1-state model), as does the final node 16, these representing the "silence" beforehand and afterward. The remaining nodes except the last corresponds to a phoneme as indicated. For example, the node 11 corresponds to the phoneme [y] of "yes".

Figure 3:
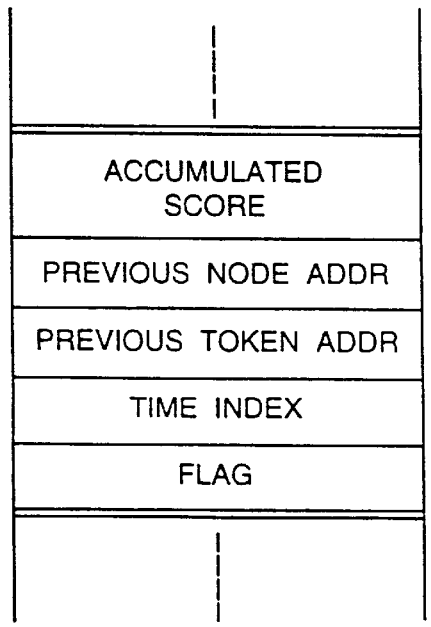
FIG. 3 shows the contents of the token store of FIG. 1.

In operation, a node receives a token containing the following information, as shown in FIG. 3:
 accumulated score from previous nodes;
 identity (address in node store) of previous node;
 identity (address in token store) of the token received by the previous node which gave rise to this token;
 the token also contains an active/inactive flag whose use will be described later.

All such tokens are stored in the token store 54 for future reference.

The first node is supplied with empty tokens at frame rate. A token arriving at any node contains a score indicating the likelihood (actually the logarithm of the probability) that the speech input so far corresponds to the models associated with the nodes on the path up to that node; thus a token arriving at node 13 contains a score indicating the likelihood that the speech so far corresponds to the utterance {y}{eh}. The task associated with the node is to compare a new speech input frame with its model. This is done by performing the calculation of equations 7 to 9 on the new frames to obtain the probability $Pr^v$ which is then added to the incoming score to obtain an updated score; a new token is then output containing this score and is passed to the next node. Usually the score is accumulated over a number of frames equal to the number of states in its model (typically 3) before outputting a token. Thereafter, a token is produced every frame. If the node receives a further token while it is still processing the first, then it compares the score of the further token with the latest score of the first (i.e. the log $Pr^v$ up-to-date plus the incoming token score) and ignores the new token or abandons the current process in favour of the new token according to whether further token score is the lower or the higher of the two.

In the example given, paths do not converge except at the last node. If converging paths are permitted then the possibility of simultaneous arrival of the two tokens is usually dealt with by ignoring the one having the lower score, though propagation of multiple paths is possible.

At the final node 16, it is possible to reject all but the highest scoring one of converging paths, but for many applications it is preferable to retain two or more. Provision is also made for terminating the propagation of tokens carrying scores which are so low that they are deemed to have no chance of resulting in a good score at the final node; this "pruning" process will be described further below. The path through the network can be identified to recover the phonemes of the utterances deemed to be recognised by tracing the successful token sequence back from the output token(s) using the 'previous token' addresses to identify the tokens in the token store.

It should perhaps be mentioned that the HM models put together into the tree-structure can be regarded as a single, large model.

As thus far described, the recogniser is, in general terms, conventional. The further features of the recogniser now to be described have the object of "propagating" a priori probabilities up into the recognition tree. Consider the tree of FIG. 4 for distinguishing among the words "cat", "cab", "cob", "dog" and "den". Suppose that as a result of some previous process the a priori probability of these occurring is represented by weighting values 0.5, 0.2, 0.3, 0.1, 0.1. This means that the scores input at the nodes 23, 24, 26, 29, 31 need to be weighted by these values before further decisions are taken. However weightings are applied to each node within the tree, as follows. The probability of the word being "cat" or "cab" or "cob" is thus represented by weightings 0.5+0.2+0.3=1.0 whereas the corresponding value for "dog" or "den" is 0.1+0.1=0.2. Consequently the scores input to the node 21 are weighted by a factor of 1.0 and those input to the node 27 are weighted by a factor of 0.2. The values associated with "cat" or "cab" on the one hand and "cob" on the other hand are 0.7 and 0.3 respectively, so the inputs to nodes 22 and 25 need to be appropriately weighted. However a factor of 1.0 has already been applied to this branch by the node 21, so that the weightings at nodes 22 and 25 are $$\text{weighting at node } 22 = \frac{0.7}{1.0} = 0.7$$

$$\text{weighting at node } 25 = \frac{0.3}{1.0} = 0.3$$

Similarly at nodes 23 and 24 we have $$\text{weighting at node } 23 = \frac{0.5}{1.0 \times 0.7} = 5/7$$

$$\text{weighting at node } 24 = \frac{0.2}{1.0 \times 0.7} = 2/7$$

Whilst at nodes 28 and 30 the weighting is $$\frac{0.1}{0.2} = 0.5$$

Figure 5:
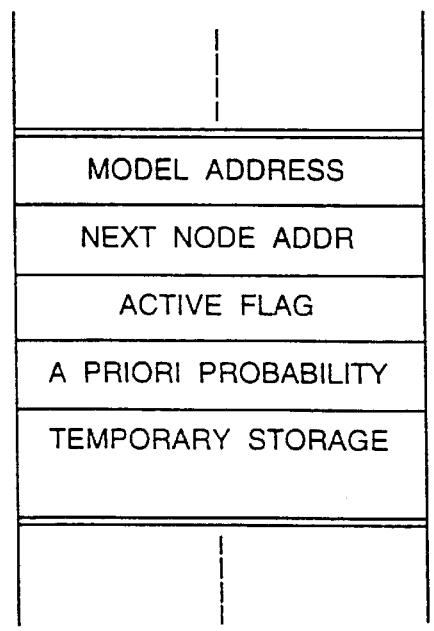
FIG. 5 shows the contents of the node store of FIG. 1.
Figure 4:
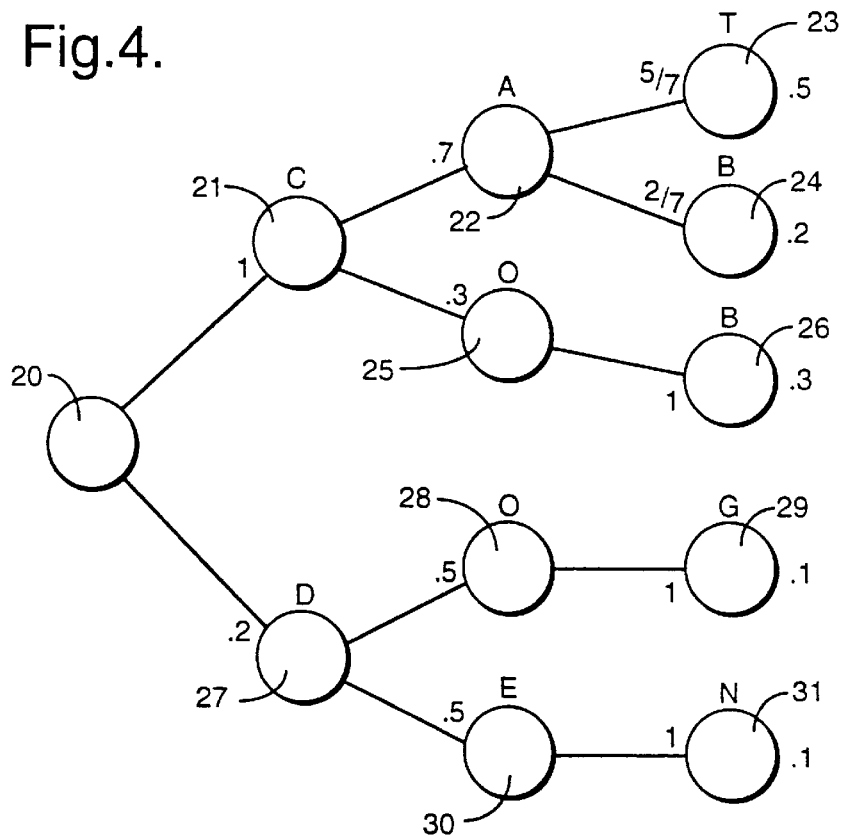
FIG. 4 illustrates the application of weightings by the apparatus of FIG. 1.

Of course, the tree of FIG. 4 is merely a conceptual representation of the process. In reality, each node is represented by an entry in the node store (as shown in FIG. 5) containing the following information:

the addresses (in the model store) of the model to be used;
the address of the next node(s) in the network;
a flag indicating whether the node is active or not;
a log value indicating the weighting associated with that node;
temporary storage for the results of calculations.

Figure 7:
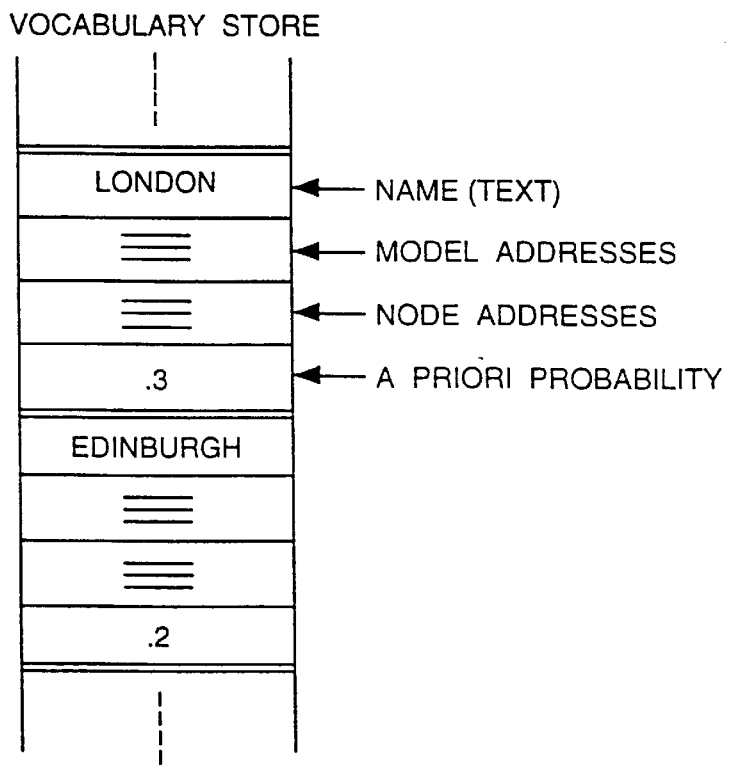
FIG. 7 illustrates the contents of the vocabulary store of FIG. 1.

The contents of the first two items are determined when the vocabulary of the recogniser is set up. This process is performed by reference to a vocabulary store 7 (FIG. 1) which contains a list of words to be recognised and, for each, a string of addresses identifying the sequence of phoneme models corresponding to the sound of that word (see also FIG. 7). The generation of the node store contents is conventional (save for that of the log weighting values which is described below); it includes insertion into the vocabulary store of the node address sequence corresponding to each word.

Figure 6:
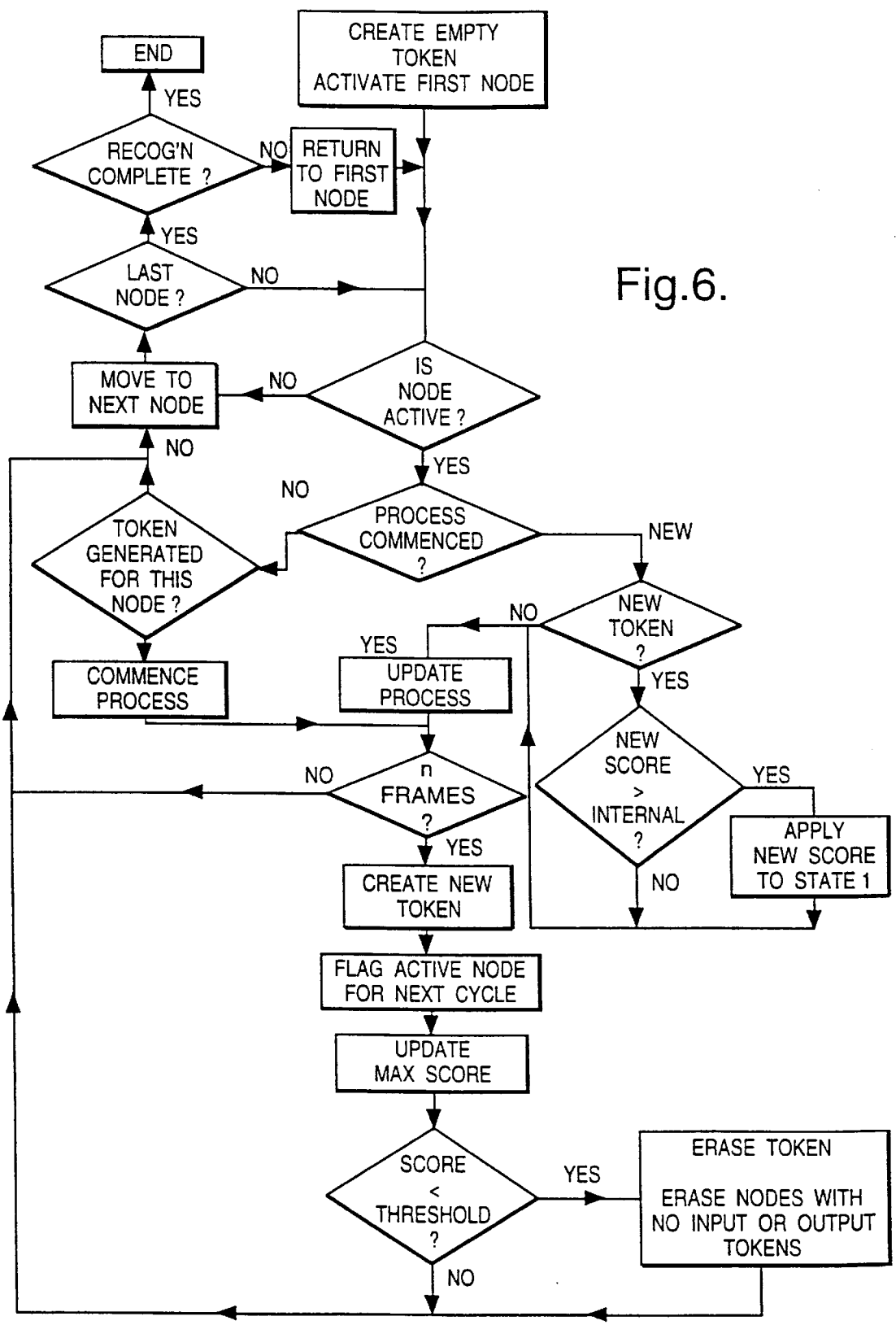
FIG. 6 is a flowchart illustrating operation of FIG. 1.

The CPU 51 performs the following process under control of the program stored in the program store 52; as shown in the flowchart of FIG. 6:

Firstly, create an empty token as input to the first node (s)—i.e. create an entry in the token store having a zero (i.e. log (1)) score and a zero issuing node address (this being taken to mean that the token is to be processed by the first node) and the date of the preceding frame. These first node(s) are then considered to be "active".

Then, each frame period, perform the following steps:
For each active node:
if an HMM process has commenced and no token to be dealt with by the node was generated during the last frame, update the HMM process using the current frame observation O. If the process has reached n frames (where n is the number of states in the particular HMM associated with the node), add to the computed likelihood value the log a priori probability value stored in the node store and create a new entry in the token store with the result (note that the current process may nevertheless continue for the next frame);

if no process has commenced, and a token to be dealt with by the node was generated during the last frame, (i.e. the active flag has just been set) commence a new HMM process using the current frame observation O. In the case of a single-state HMM, create a new entry in the token store with the result; (note that the current process may nevertheless continue for the next frame);

if a process has commenced and a token to be dealt with by the node was generated, compare the incoming and internal scores and according to the result continue the process as above, either unchanged or with the incoming score as input to the first state.

For each token generated
obtain the issuing node address from the token score;
obtain the 'next node' address(es) from the node store entry for the issuing node;
flag each such next node as active for the next frame.
If a new entry in the token store has been created:
if the associated score exceeds a stored "maximum score for all tokens" figure, update this figure;
if the associated score is less than the stored "maximum score all tokens" figure by more than a predetermined margin (e.g. 50), erase the token store entry (the "pruning" step). If this results in any node having no input tokens and no output then deactivate it (i.e. erase the node store entry).

At the final node:
The decision as to when recognition has completed and traceback of the recognition paths can take place is based on a system of rules and thresholds against which specific measures are checked. Thus, for every frame, trace back the best token appearing at the final node to examine how many frames have been spent in the final noise node. (Assumes that all paths in the network have a noise node as the end). If the duration is greater than some threshold and the path score is better than another threshold then stop recognising (i.e. we essentially wait until the recognition score for a complete path is reasonably good and that the path contains a reasonable amount of noise at the end, typically 20 frames i.e. 0.32 seconds). This is the simplest description of an end of speech detection algorithm. In practice the algorithm may be extended by additional checks on the SNR of the signal to date and the variance of the noise energy. Also there are a number of timeouts to ensure that the end of speech detection will trigger eventually, in the event that the above checks continually fail.

Then, for the highest-scoring token, or for each of the $N_{out}$ highest scoring tokens, where $N_{out}$ is the desired number of output choices:

(a) retrieve from the token the previous node address and thence the associated model identifier;
(b) retrieve the previous token store entry;
(c) repeat (a) and (b) until all the models have been identified.

The recognised words, along with their associated scores, are now available.

The above description is of the recognition process: before such a process can commence it is necessary that the log a priori probabilities be entered in the node store. Assume that a preceding recognition process has created a priori probability values in the format shown in FIG. 7, where each of a number of town names (for example) has a probability assigned to it. The CPU 52 performs the following set up process for deriving the node a priori probability values.

First it is necessary to translate the words into node sequences, by reference to the vocabulary store 7, so that, for each possible path through the recognition tree, the total of the log a priori values for each node en route is known. It is then necessary to compute the individual values for each node, as was done in the illustration of FIG. 4, as follows:

(a) assign the given probability values to the final nodes corresponding to the respective words;

(b) proceeding from right to left (as drawn in FIG. 4), assign for each node a probability value which is the sum of those assigned to the nodes which follow it (the first node is taken in FIG. 4 to have an assigned value of 1);

(c) proceeding from left to right, divide the probability value for each node by the value assigned to the node which precedes it;

(d) take logs of all the values.

Figure 8:
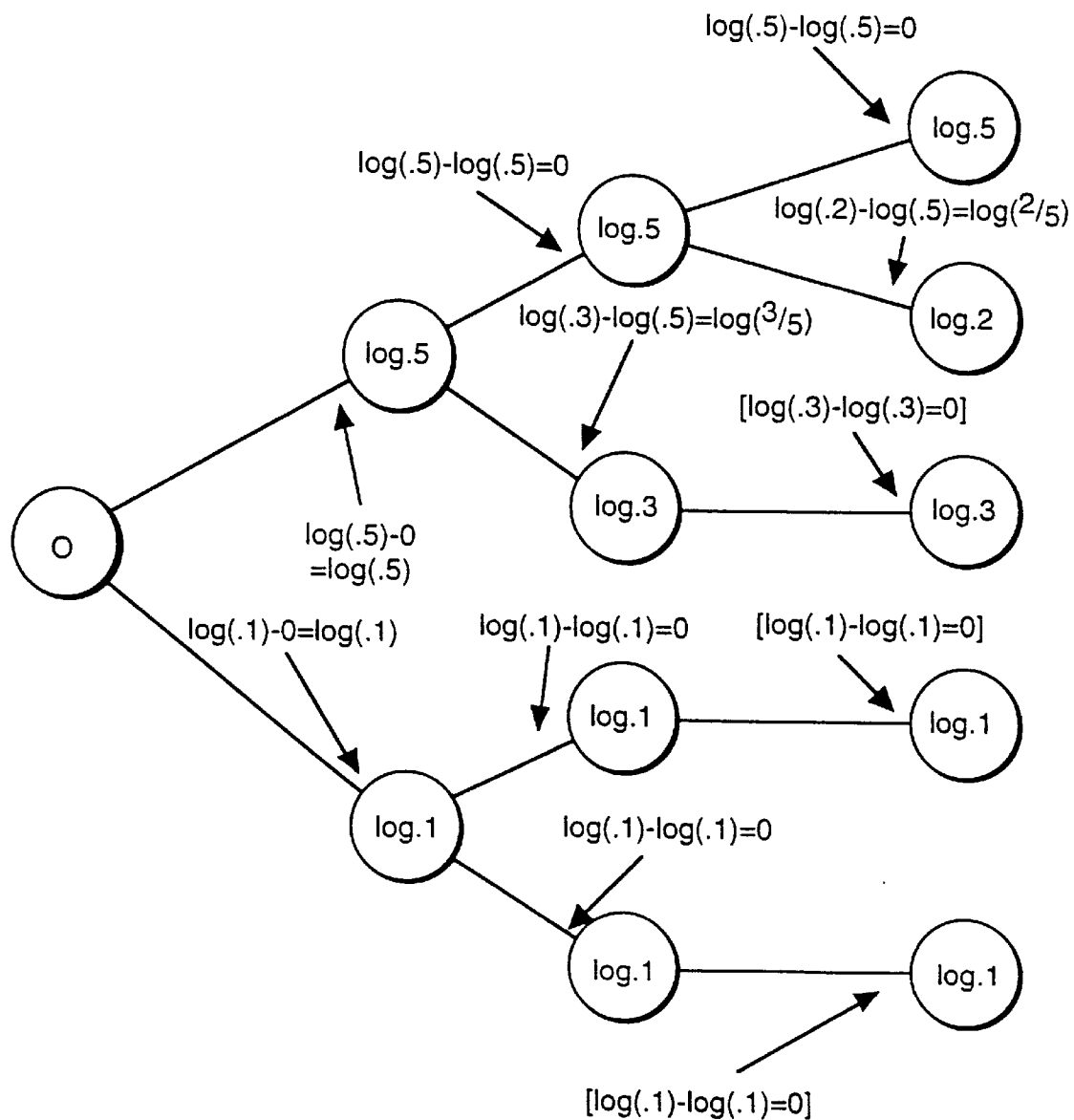
FIG. 8 illustrates an alternative weighting procedure to that of FIG. 4.

In practice, a computationally less onerous technique is to work with log values throughout, and take the maximum rather than the sum. Thus, (as shown in FIG. 8):

(a) assign the given log probability values to the final nodes corresponding to the respective words;

(b) assign to each node a log probability value which is the maximum of those assigned to the node or nodes which follow it (assign zero to the first node);

(c) subtract from the value for each node the value assigned to the node which precedes it.

The calculations on unbranched links (shown in square brackets) do not of course need to be performed.

In the above description, the primary criterion is that tokens are erased if they carry a score which falls below a threshold value, viz. a proportion of the 'best path' score at any time. In fact since log probabilities are used, the comparison is between the log score and the best log score minus a fixed margin value which is set to give the best average performance.

However, the optimum pruning level to use will in practice depend upon the actual spoken utterance. In a modification, therefore, the pruning is adjusted as a function of the current computational load on the recogniser. For example, it may be adjusted in dependence on the number of active nodes. Thus, 1. If only a few nodes are active, the pruning threshold is relaxed—more nodes remain active, leading to potentially higher accuracy.

2. If many nodes are active, the pruning threshold is tightened, leading to a reduction in the amount of computation.

One possible implementation of this is to adjust the threshold so as to keep the number of active nodes substantially constant. Thus, each time frame, the number of active nodes $n_a$ is compared with a desired target $n_t$ (e.g. 1300). The threshold margin value $M_T$ is allowed to vary from a starting value of $M_0$ (e.g. 100) between a floor value $M_{min}$ (e.g. 75) and a ceiling value $M_{max}$ (e.g. 150), by a step value $M_s$ (e.g. 2). The following steps take place each time frame.

$$\text{If } n_a > n_t \text{ and } M_T > M_{min} \text{ then } M = M - M_s \quad (1)$$

$$\text{If } n_a < n_t \text{ and } M_T < M_{max} \text{ then } M = M + M_s. \quad (2)$$

Other criteria may however be applied, for example the decision might be based on the number of active model states or (especially in recognisers with very large vocabularies) the number of active words.

This dynamic threshold adjustment may also be used in systems which do not apply a priori weightings.

The recogniser described above is one which is restricted to having only a finite number M of possible observations generated in a particular state. If desired, however, the probability $b_{jk}$ may be replaced by a continuous probability density $b_j(O)$ which has a value for any observation O. As is known, a general continuous probability density can successfully be approximated by a weighted sum (or mixture) of a discrete number of continuous functions of more constrained form—usually a Gaussian distribution. Thus the probability density function is:

$$b_j(O) = \sum_{x=1}^{X} c_{jx} N[O, \mu_{jx}, U_{jx}] \quad (10)$$

where X is the number of components (or "modes") in the mixture, $c_{jx}$ is the weight of mode x in state j and $N[O, \mu_{jx}, U_{jx}]$ is the probability of drawing the vector O from a multivariate normal distribution with mean vector $\mu_{jx}$ and covariance matrix $U_{jx}$.

For a Gaussian distribution:

$$N = \frac{1}{(2\pi)^{d/2} |U_{jx}|^{1/2}} \exp\left[-\frac{1}{2}(O - \mu_{jx})^T U^{-1}(O - \mu_{jx})\right] \quad (11)$$

where d is the size of the vectors. This, if U is a diagonal matrix with terms $\sigma_i$, reduces to $$N = \frac{1}{(2\pi)^{d/2} |U_{jx}|^{1/2}} \exp\left[-\frac{1}{2} \sum_{i=1}^{d} \frac{(v_i - \mu_i)^2}{\sigma_i^2}\right] \quad (12)$$

where $v_i$ are the elements of O.

The recognition process of equations 1–9 is unchanged; only the definition of b is different. Training processes for such continuous density models are known and will not, therefore, be described.

The parallel processing method is simpler than the tree processing method described so far. A typical such process, involving pruning, involves maintaining a running list of the top (e.g.) six 'best' candidates as models are examined. For example:

(a) compare the unknown word with the first six models and generate a list of these models, recording a similarity score for each;

(b) compare the unknown word with a further model. If the score obtained is higher—i.e. more indicative of similarity—than any in the list, substitute the new model and score for the lowest-scoring entry in the list;

(c) repeat step (b) until all models have been processed. This process results in a list of the six highest-scoring models. If a priori probabilities are to be applied prior to selection of the best candidate, each of the six scores is multiplied by the relevant weighting factor, and the candidate having the best weighted score is selected.

In the proposed method, the weighting is applied during the recognition process itself; viz.

(a) compare the unknown word with the first six models, generating a similarity score for each. Multiply the score by the weighting factor for the respective model. Generate a list of these models, recording the weighted score for each;

(b) compare the unknown word with a further model. Multiply the score by the weighting factor for that model. If the weighted score obtained is higher than any in the list, substitute the new model and weighted score for the entry in the list having the lowest weighted score;

(c) repeat step (b) until all models have been processed.

What is claimed is:

1. A method of speech recognition comprising the steps of:

comparing a portion of an unknown utterance with reference models to generate a measure of similarity;

repetitively comparing further portions of the unknown utterance with reference models to generate, for each of a plurality of allowable sequences of reference models defined by stored data defining such sequences, accumulated measures of similarity including contributions from previously generated measures obtained from comparison of one or more earlier portions of the utterance with a reference model or models in the respective allowable sequence; and weighting the accumulated measures in accordance with predetermined weighting factors representing an a priori probability for each of the allowable sequences wherein the weighting step is performed by weighting each computation of a measure or accumulated measure for a partial sequence by combined values of the weighting factors for each of the allowable sequences which commences with that partial sequence, modified by any such combined values of the weighting factors applied to a measure generated in respect of a shorter sequence with which that partial sequence commences.

2. A method as in claim 1 further comprising the step of:

excluding from further repetitive comparison any sequence for which the weighted accumulated measure is, to a degree defined by a pruning criterion, less indicative of similarity than the measures for other such sequences.

3. A method as in claim 2 wherein the excluding step includes a sub-step of repeatedly adjusting the pruning criterion in dependence upon the number of measures generated and not excluded from further repetitive comparison, such as to tend to maintain that number constant.

4. Speech recognition apparatus comprising:

storage means for storing data relating to reference models representing utterances and data defining allowable sequences of reference models;

comparing means to repetitively compare portions of an unknown utterance with reference models to generate, for each of a plurality of allowable sequences of reference models defined by stored data defining such sequences, accumulated measures of similarity including contributions from previously generated measures obtained from comparison of one or more earlier portions of the utterance with a reference model or models in the respective allowable sequence; and weighting means operable to weight the accumulated measures in accordance with predetermined weighting factors representing an a priori probability for each of the allowable sequences wherein the weighting means is operable to weight a measure or accumulated measure for a partial sequence by combined values of the weighting factors for each of the allowable sequences which commences with that partial sequence, modified by any such combined values of the weighting factors applied to a measure generated in respect of a shorter sequence with which that partial sequence commences.

5. Apparatus as in claim 4 further comprising:

excluding means to exclude from further repetitive comparison any sequence for which the weighted accumulated measure is, to a degree defined by a predetermined pruning criterion, less indicative of similarity than the measures for other such sequences.

6. Apparatus as in claim 5 wherein the excluding means is arranged to repeatedly adjust the pruning criterion in dependence upon the number of measures generated and not excluded from further repetitive comparison, such as to tend to maintain that number constant.

7. A method of assigning a weighting factor to each node of a speech recognition network representing a plurality of allowable sequences of reference models each allowable sequence having a predetermined weighting factor representing an a priori probability, said method comprising:

combining, for each node, the values of the predetermined weighting factor(s) for each of the allowable sequence (s) which commence with a partial sequence incorporating the node modified by any weighting factors applied to nodes representing a shorter sequence with which that partial sequence commences.

8. A method of speech recognition in which a network incorporating weighting factors formed by the method according to claim 7 is used.

9. A method as in claim 7 comprising the further steps of:

assigning the log of the predetermined weighting factors to the final nodes of the network corresponding to the allowable sequences;

assigning to each preceding node a log probability value which is the maximum of those values assigned to the node or nodes which follow it; and subtracting from the value for each node the value assigned to the node which precedes it.

10. A method as in claim 7 wherein the nodes are associated with models representing reference utterances and including the sub-step of modifying parameters of the associated models to reflect the weighting factor assigned to each node.

11. A method as in claim 7, wherein the recognition network has a tree-structure, at least one node other than the first having more than one branch.

12. Speech recognition apparatus including a data store containing data relating to a network incorporating weighting factors defined by the method of claim 7.

* * * * *